United States Patent
Amizur et al.

(10) Patent No.: US 10,393,850 B2
(45) Date of Patent: Aug. 27, 2019

(54) APPARATUS, SYSTEM AND METHOD OF ANGLE OF DEPARTURE (AOD) ESTIMATION

(71) Applicant: Intel IP Corporation, Santa Clara, CA (US)

(72) Inventors: Yuval Amizur, Kfar-Saba (IL); Nir Dvorecki, Herzeliya (IL)

(73) Assignee: Intel IP Corporation, Santa Clara, CA (US)

( * ) Notice: Subject to any disclaimer, the term of this patent is extended or adjusted under 35 U.S.C. 154(b) by 508 days.

(21) Appl. No.: 15/086,972

(22) Filed: Mar. 31, 2016

(65) Prior Publication Data
US 2017/0212204 A1 Jul. 27, 2017

Related U.S. Application Data
(60) Provisional application No. 62/281,345, filed on Jan. 21, 2016.

(51) Int. Cl.
| | | |
|---|---|---|
| *G01S 3/14* | (2006.01) | |
| *H04W 64/00* | (2009.01) | |
| *G01S 3/74* | (2006.01) | |

(52) U.S. Cl.
CPC .............. *G01S 3/14* (2013.01); *H04W 64/00* (2013.01); *G01S 3/74* (2013.01)

(58) Field of Classification Search
CPC ............ G01S 3/14; G01S 3/74; H04W 64/00
USPC .................................................. 342/385, 417
See application file for complete search history.

(56) References Cited

U.S. PATENT DOCUMENTS

| | | | |
|---|---|---|---|
| 8,244,174 B1 | 8/2012 | Kong | |
| 8,649,800 B2 * | 2/2014 | Kalliola | G01C 21/20 |
| | | | 455/456.1 |
| 8,723,729 B2 * | 5/2014 | Desai | G01S 3/50 |
| | | | 342/433 |
| 9,699,618 B2 * | 7/2017 | Singh | H04W 4/029 |

(Continued)

FOREIGN PATENT DOCUMENTS

| | | |
|---|---|---|
| CN | 103945331 | 7/2014 |
| WO | 2015130618 | 9/2015 |
| WO | 2017127154 | 7/2017 |

OTHER PUBLICATIONS

"International Application Serial No. PCT/US2016/063277, International Search Report dated Jan. 18, 2017", 3 pgs.

(Continued)

*Primary Examiner* — Chuong P Nguyen
(74) *Attorney, Agent, or Firm* — Schwegman Lundberg Woessner, P.A.

(57) ABSTRACT

Devices and methods of estimating the AoD of a STA are generally described. The STA receives and stores an association between tone and transmission angle for each tone transmitted by an AP in different angles. The association indicates that, for each angle, a tone transmitted in the angle is unique. The STA detects a symbol transmitted on each tone, determines the strength and timing of the tone and estimates the AoD based on the association and either or both the strength and timing. Each tone may have multiple symbols and/or each angle multiple tones whose characteristics are averaged to determine the appropriate characteristic of the particular tone or angle. The position of the STA is calculated from the AoD of one or more APs.

26 Claims, 7 Drawing Sheets

(56) References Cited

U.S. PATENT DOCUMENTS

| | | | |
|---|---|---|---|
| 9,755,797 B2* | 9/2017 | Wu | G01S 5/0036 |
| 9,814,051 B1* | 11/2017 | Shpak | H04L 27/2656 |
| 10,028,089 B2* | 7/2018 | Na | G01S 5/0252 |
| 2009/0243932 A1* | 10/2009 | Moshfeghi | G01S 5/14 |
| | | | 342/378 |
| 2014/0070996 A1* | 3/2014 | Kneckt | H04W 64/006 |
| | | | 342/386 |
| 2014/0072307 A1 | 3/2014 | Zamani et al. | |
| 2014/0162693 A1* | 6/2014 | Wachter | H04W 4/04 |
| | | | 455/456.3 |
| 2015/0188678 A1 | 7/2015 | Wu et al. | |
| 2017/0070893 A1* | 3/2017 | Wang | H04W 64/00 |
| 2017/0131380 A1* | 5/2017 | Malik | G01S 3/023 |
| 2017/0131381 A1* | 5/2017 | Malik | G01S 3/50 |
| 2017/0295004 A1* | 10/2017 | Amizur | H04L 5/0053 |
| 2018/0131540 A1* | 5/2018 | Malik | H04L 25/0224 |
| 2018/0310133 A1* | 10/2018 | Ramasamy | H04W 4/025 |
| 2018/0317197 A1* | 11/2018 | Kasher | H04W 64/006 |
| 2019/0086505 A1* | 3/2019 | Malik | G01S 3/143 |

OTHER PUBLICATIONS

"International Application Serial No. PCT/US2016/063277, Written Opinion dated Jan. 18, 2017", 5 pgs.

* cited by examiner

APPARATUS, SYSTEM AND METHOD OF ANGLE OF DEPARTURE (AOD) ESTIMATION

PRIORITY CLAIM

This application claims the benefit of priority to U.S. Provisional Patent Application Ser. No. 62/281,345, filed Jan. 21, 2016, and entitled "APPARATUS, SYSTEM AND METHOD OF ANGLE OF DEPARTURE (AOD) ESTIMATION," which is incorporated herein by reference in its entirety.

TECHNICAL FIELD

Embodiments pertain to wireless networks. Some embodiments relate to wireless local area networks (WLANs) and Wi-Fi networks including networks operating in accordance with the Institute of Electrical and Electronics Engineers (IEEE) 802.11 family of standards, such as the IEEE 802.11ac standard, the IEEE 802.11ax study group (SG) (named DensiFi) or IEEE 802.11ay or IEEE 802.11az. Some embodiments relate to WiFi positioning of a station (STA).

BACKGROUND

The use of mobile communication devices (also referred to as stations (STAs)) continues to increase among all walks of modern society. The various uses and capabilities of STAs has continued to drive demand for a wide variety of networked STAs in a number of disparate environments. Many applications use aspects of the STA characteristics, such as the increasing processing ability and screen size, as well as environmental conditions to expand use at home and work. One of the most popular environmental conditions employed by applications and advertisers is STA location. In many circumstances, the STA performs a relatively large number of calculations to determine the location, burdening the STA and draining the battery life of the STA.

BRIEF DESCRIPTION OF THE FIGURES

In the figures, which are not necessarily drawn to scale, like numerals may describe similar components in different views. Like numerals having different letter suffixes may represent different instances of similar components. The figures illustrate generally, by way of example, but not by way of limitation, various embodiments discussed in the present document.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
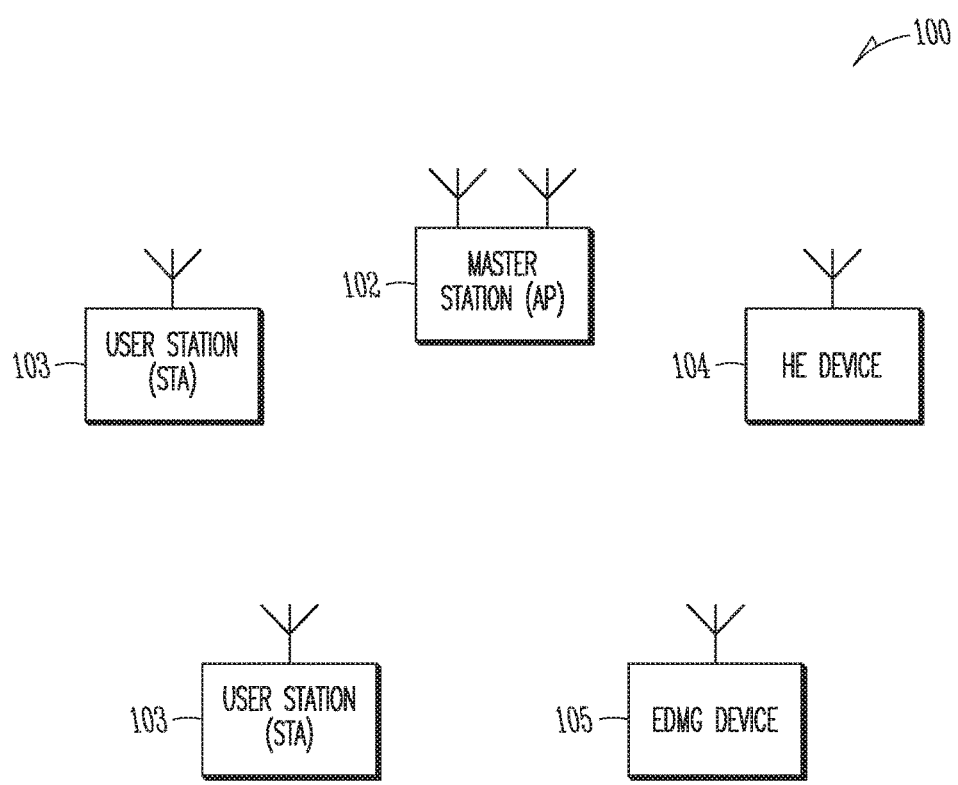
FIG. 1 is a functional diagram of a wireless network in accordance with some embodiments.

FIG. 1 illustrates a wireless network in accordance with some embodiments. Elements in the network 100 may engage in channel bonding, as described herein. In some embodiments, the network 100 may be an Enhanced Directional Multi Gigabit (EDMG) network. In some embodiments, the network 100 may be a High Efficiency Wireless Local Area Network (HE) network. In some embodiments, the network 100 may be a Wireless Local Area Network (WLAN) or a Wi-Fi network. These embodiments are not limiting, however, as some embodiments of the network 100 may include a combination of such networks. As an example, the network 100 may support EDMG devices in some cases, non EDMG devices in some cases, and a combination of EDMG devices and non EDMG devices in some cases. As another example, the network 100 may support HE devices in some cases, non HE devices in some cases, and a combination of HE devices and non HE devices in some cases. As another example, some devices supported by the network 100 may be configured to operate according to EDMG operation and/or HE operation and/or legacy operation. Accordingly, it is understood that although techniques described herein may refer to a non EDMG device, an EDMG device, a non HE device or an HE device, such techniques may be applicable to any or all such devices in some cases.

The network 100 may include any number (including zero) of master stations (STA) 102, user stations (STAs) 103 (legacy STAs), HE stations 104 (HE devices), and EDMG stations 105 (EDMG devices). It should be noted that in some embodiments, the master station 102 may be a stationary non-mobile device, such as an access point (AP). In some embodiments, the STAs 103 may be legacy stations. These embodiments are not limiting, however, as the STAs 103 may be HE devices or may support HE operation in some embodiments. In some embodiments, the STAs 103 may be EDMG devices or may support EDMG operation. It should be noted that embodiments are not limited to the number of master STAs 102, STAs 103, HE stations 104 or EDMG stations 105 shown in the example network 100 in FIG. 1. Legacy STAs 103 may include, for example, non-HT STA (e.g., IEEE 802.11a/g stations), HT STA (e.g., IEEE 802.11n stations), and VHT STA (e.g., IEEE 802.11ac stations).

The master station 102 may be arranged to communicate with the STAs 103 and/or the HE STAs 104 and/or the EDMG STAs 105 in accordance with one or more of the IEEE 802.11 standards. In accordance with some embodiments, an AP may operate as the master station 102 and may be arranged to contend for a wireless medium (e.g., during a contention period) to receive exclusive control of the medium for a HE control period (i.e., a transmission opportunity (TXOP)). The master station 102 may, for example, transmit a master-sync or control transmission at the beginning of the HE control period to indicate, among other things, which HE stations 104 are scheduled for communication during the HE control period. During the HE control period, the scheduled HE stations 104 may communicate with the master station 102 in accordance with a non-contention based multiple access technique. In some embodiments, the STAs 103 may communicate in accordance with a contention-based communication technique, rather than a non-contention based multiple access technique. During the HE control period, the master station 102 may communicate with HE stations 104 using one or more HE frames. During the HE control period, STAs 103 not operating as HE devices may refrain from communicating in some cases. In some embodiments, the master-sync transmission may be referred to as a control and schedule transmission.

In some embodiments, the multiple-access technique used during the HE control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique including a multi-user (MU) multiple-input multiple-output (MIMO) (MU-MIMO) technique. These multiple-access techniques used during the HE control period may be configured for uplink or downlink data communications.

The master station 102 may also communicate with STAs 103 and/or other legacy stations in accordance with legacy IEEE 802.11 communication techniques. In some embodiments, the master station 102 may also be configurable to communicate with the HE stations 104 outside the HE control period in accordance with legacy IEEE 802.11 communication techniques, although this is not a requirement.

In some embodiments, the HE communications during the HE control period may be configurable to use one of 20 MHz, 40 MHz, or 80 MHz contiguous bandwidths or an 80+80 MHz (160 MHz) non-contiguous bandwidth. In some embodiments, a 320 MHz channel width may be used. In some embodiments, subchannel bandwidths less than 20 MHz may also be used. In these embodiments, each channel or subchannel (or tone) of an HE communication may be configured for transmitting a number of spatial streams.

In some embodiments, EDMG communication may be configurable to use channel resources that may include one or more frequency bands of 2.16 GHz, 4.32 GHz or other bandwidth. Such channel resources may or may not be contiguous in frequency. As a non-limiting example, EDMG communication may be performed in channel resources at or near a carrier frequency of 60 GHz.

In some embodiments, primary channel resources may include one or more such bandwidths, which may or may not be contiguous in frequency. As a non-limiting example, channel resources spanning a 2.16 GHz or 4.32 GHz bandwidth may be designated as the primary channel resources. As another non-limiting example, channel resources spanning a 20 MHz bandwidth may be designated as the primary channel resources. In some embodiments, secondary channel resources may also be used, which may or may not be contiguous in frequency. As a non-limiting example, the secondary channel resources may include one or more frequency bands of 2.16 GHz bandwidth, 4.32 GHz bandwidth or other bandwidth. As another non-limiting example, the secondary channel resources may include one or more frequency bands of 20 MHz bandwidth or other bandwidth.

In some embodiments, the primary channel resources may be used for transmission of control messages, beacon frames or other frames or signals by the AP 102. As such, the primary channel resources may be at least partly reserved for such transmissions. In some cases, the primary channel resources may also be used for transmission of data payloads and/or other signals. In some embodiments, the transmission of the beacon frames may be restricted such that the AP 102 does not transmit beacons on the secondary channel resources. Accordingly, beacon transmission may be reserved for the primary channel resources and may be restricted and/or prohibited in the secondary channel resources, in some cases.

In accordance with some embodiments, a master station 102 and/or HE stations 104 may generate an HE packet in accordance with a short preamble format or a long preamble format. The HE packet may comprise a legacy signal field (L-SIG) followed by one or more high-efficiency (HE) signal fields (HE-SIG) and an HE long-training field (HE-LTF). For the short preamble format, the fields may be configured for shorter-delay spread channels. For the long preamble format, the fields may be configured for longer-delay spread channels. These embodiments are described in more detail below. It should be noted that the terms "HEW" and "HE" may be used interchangeably and both terms may refer to high-efficiency Wireless Local Area Network operation and/or high-efficiency Wi-Fi operation.

In some embodiments, channel bonding may be used in communications between the various devices, for example, the STAs 103. In channel bonding, two or more channels may be used simultaneously. e.g., in the same physical layer (PHY) packet to achieve higher throughput. Due to the directional nature of transmissions in the 60 GHz band, to use channel bonding a clear channel may be assessed before transmission. Thus, both sides of a particular link, i.e., the TXOP initiator and the TXOP responder, may assess the clear channel prior to transmission. Every wideband transmission opportunity may start with a Request to Send (RTS) and a Clear to Send (CTS) (RTS/CTS) protocol.

For example, a STA 103 may transmit a RTS message to the AP 102. After a Short Inter Frame Space (SIFS) period, if the medium is available, the AP 102 may respond to the RTS by broadcasting a CTS message. After the CTS message is received by the STA 103, the STA 103 may wait until a backoff counter reaches zero. The STA 103 may then transmit the data packet to the AP 102 during the TXOP. If the medium becomes busy before the backoff counter reaches zero, the STA 103 may sense when the medium again becomes available and transmit another RTS message to the AP 102.

After each transmission, the STA 103 may pick a new backoff time. Assuming the STA 103 received an acknowledgment (ACK) from the AP 102 indicating reception of the packet by the AP 102, if the backoff counter expires before the next packet arrives for transmission, the STA 103 can transmit after sensing the channel to be idle for the DIFS period. If the last transmission was unsuccessful, as evidenced by the lack of reception of the ACK by the STA 103, the STA 103 may wait for an Extended Inter Frame Space (EIFS) period, which is longer than the DIFS period. If the STA 103 has a data packet waiting for transmission and the backoff counter expires, but the carrier sensing detects that the carrier is occupied, the STA 103 may select a second backoff time for the backoff counter and transmit the packet when the second backoff time has expired.

In some embodiments, STAs may use a Short Inter Frame Space (SIFS) for the RTS/CTS message and for a positive ACK-based high priority transmission. Once the SIFS duration elapses, the transmission can immediately start. Depending on the physical layer configuration, the SIFS duration may be 6, 10 or 28 μs. A PCF Inter Frame Space (PIFS) may be used by the PCF during contention free operations. After the PIFS period elapses, STAs having data to be transmitted in contention free period can be initiated, preempting contention based traffic. The DIFS period is the minimum idle time for contention based services. STAs may access the channel immediately if it is free after the DIFS period. The EIFS period may be used, as above, when there is erroneous frame transmission. The Arbitration Inter Frame Space period (AIFS) may be used by QoS STAs to transmit all frames (data and control).

In particular, the CCA process may be performed by the physical layer. The physical layer can be divided into two sublayers. The sublayers may include the physical medium dependent (PMD, lower sublayer) and the physical layer convergence procedure (PLCP, upper sublayer). The physical layer may determine whether the channel is clear and communicate this to the MAC layer. The PMD may indicate to the PLCP sublayer whether the medium is in use. The PLCP sublayer may communicate with the MAC layer to indicate a busy or idle medium, which may prevent the MAC layer from attempting to forward a frame for transmission. CCA, may include both energy detection (ED) and CS. For the CS CCA process, the STA 103 may detect and decode a WiFi preamble from the PLCP header field. For the ED CCA process, the STA 103 may detect non-WiFi energy in the operating channel and backoff data transmission. The ED threshold may be dependent in some embodiments on the channel width. If the non-WiFi energy exceeds the ED threshold for a predetermined amount of time, the STA 103 may determine that the medium is busy until the energy is below the threshold.

Figure 2:
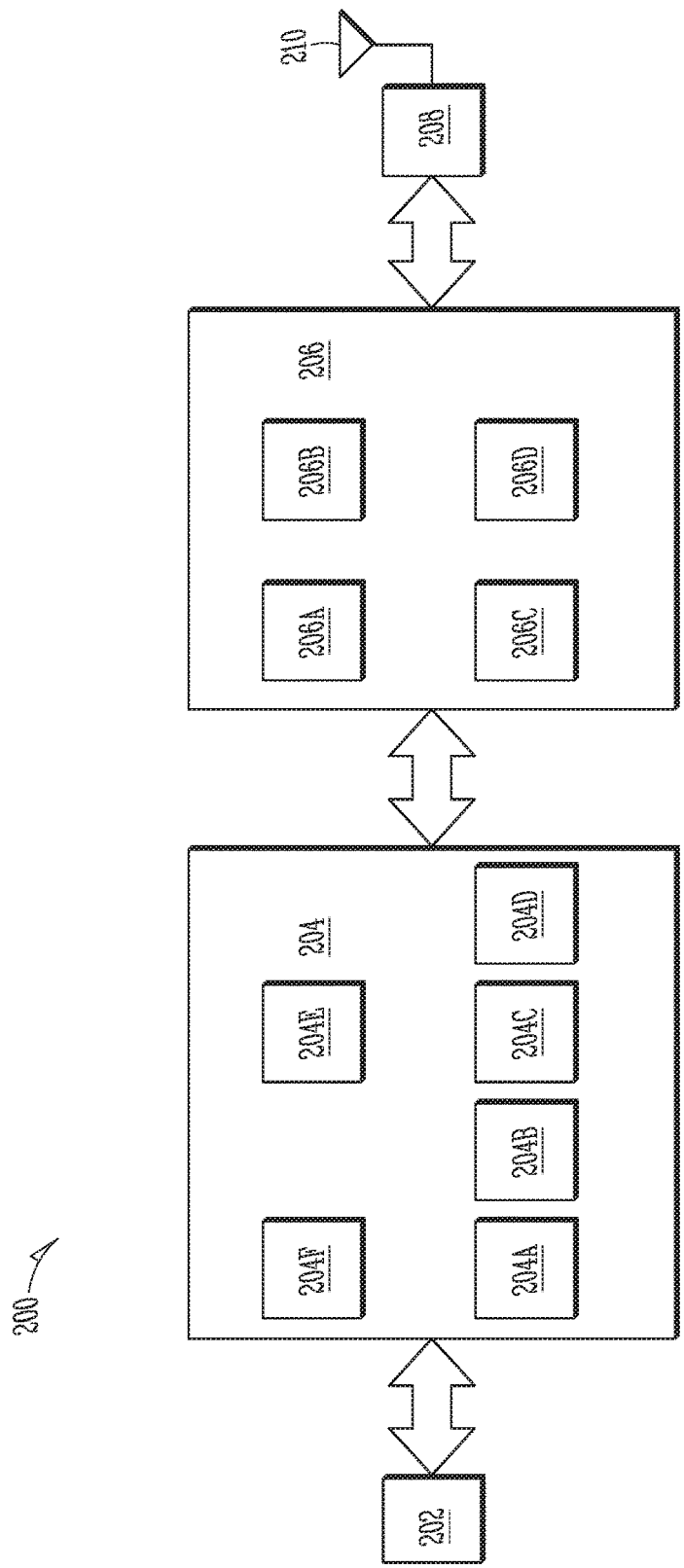
FIG. 2 illustrates components of a communication device in accordance with some embodiments.

Embodiments described herein may be implemented into a system using any suitably configured hardware and/or software. FIG. 2 illustrates components of a communication device in accordance with some embodiments. The communication device 200 may be one of the UEs 102a or STAs 103 shown in FIG. 1 and may be a stationary, non-mobile device or may be a mobile device. In some embodiments, the communication device 200 may include application circuitry 202, baseband circuitry 204, Radio Frequency (RF) circuitry 206, front-end module (FEM) circuitry 208 and one or more antennas 210, coupled together at least as shown. At least some of the baseband circuitry 204, RF circuitry 206, and FEM circuitry 208 may form a transceiver. In some embodiments, other network elements, such as the eNB or AP may contain some or all of the components shown in FIG. 2.

The application or processing circuitry 202 may include one or more application processors. For example, the application circuitry 202 may include circuitry such as, but not limited to, one core processors-core or multi- or more single The processor(s) may include any combination of general-purpose processors and dedicated processors (e.g., graphics processors, application processors, etc.). The processors may be coupled with and/or may include memory/storage and may be configured to execute instructions stored in the memory/storage to enable various applications and/or operating systems to run on the system.

The baseband circuitry 204 may include circuitry such as, but not limited to, one core processors. The baseband circuitry-core or multi- or more single 204 may include one or more baseband processors and/or control logic to process baseband signals received from a receive signal path of the RF circuitry 206 and to generate baseband signals for a transmit signal path of the RF circuitry 206. Baseband processing circuitry 204 may interface with the application circuitry 202 for generation and processing of the baseband signals and for controlling operations of the RF circuitry 206. For example, in some embodiments, the baseband circuitry 204 may include a second generation (2G) baseband processor 204a, third generation (3G) baseband processor 204b, fourth generation (4G) baseband processor 204c, and/or other baseband processor(s) 204d for other existing generations, generations in development or to be developed in the future (e.g., fifth generation (5G), 6G, etc.). The baseband circuitry 204 (e.g., one or more of baseband processors 204a-d) may handle various radio control functions that enable communication with one or more radio networks via the RF circuitry 206. The radio control functions may include, but are not limited to, signal modulation/demodulation, encoding/decoding, radio frequency shifting, etc. In some embodiments, modulation/demodulation circuitry of the baseband circuitry 204 may include Fast-Fourier Transform (FFT), precoding, and/or constellation mapping/demapping functionality. In some embodiments, encoding/decoding circuitry of the baseband circuitry 204 may include convolution, tail-biting convolution, turbo, Viterbi, and/or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 204 may include elements of a protocol stack such as, for example, elements of an evolved universal terrestrial radio access (network (EUTRAN and/or IEEE 802.11 protocol including, for example, physical (PHY), media access control (MAC), radio link control (RLC), packet data convergence protocol (PDCP), and/or radio resource control (RRC) elements. A central processing unit (CPU) 204e of the baseband circuitry 204 may be configured to run elements of the protocol stack for signaling of the PHY, MAC, RLC, PDCP and/or RRC layers. In some embodiments, the baseband circuitry may include one or more audio digital signal processor(s) (DSP) 204f. The audio DSP(s) 204f may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 204 and the application circuitry 202 may be implemented (together such as, for example, on a system on a chip (SOC In some embodiments, the baseband circuitry 204 may provide for communication compatible with one or more radio technologies. For example, in some embodiments, the baseband circuitry 204 may support communication with an evolved universal terrestrial radio access network (EUTRAN) and/or other wireless metropolitan area networks (WMAN), a wireless local area network (WLAN), a wireless personal area network (WPAN). Embodiments in which the baseband circuitry 204 is configured to support radio communications of more than one wireless protocol mode baseband circuitry—may be referred to as multi In some embodiments, the device can be configured to operate in accordance with communication standards or other protocols or standards, including Institute of Electrical and Electronic Engineers (IEEE) 802.16 wireless technology (WiMax), IEEE 802.11 wireless technology (WiFi) including IEEE 802 ad, which operates in the 60 GHz millimeter wave spectrum, and 802.11ax, various other wireless technologies such as global system for mobile communications (GSM), enhanced data rates for GSM evolution (EDGE), GSM EDGE radio access network (GERAN), universal mobile telecommunications system (UMTS), UMTS terrestrial radio access network (UTRAN), or other 2G, 3G, 4G, 5G, etc. technologies either already developed or to be developed.

RF circuitry 206 may enable communication with wireless networks using modulated electromagnetic radiation through a non-solid medium. In various embodiments, the RF circuitry 206 may include switches, filters, amplifiers, etc. to facilitate the communication with the wireless network. RF circuitry 206 may include a receive signal path which may include circuitry to down-convert RF signals received from the FEM circuitry 208 and provide baseband signals to the baseband circuitry 204. RF circuitry 206 may also include a transmit signal path which may include circuitry to up-convert baseband signals provided by the baseband circuitry 204 and provide RF output signals to the FEM circuitry 208 for transmission.

In some embodiments, the RF circuitry 206 may include a receive signal path and a transmit signal path. The receive signal path of the RF circuitry 206 may include mixer circuitry 206a, amplifier circuitry 206b and filter circuitry 206c. The transmit signal path of the RF circuitry 206 may include filter circuitry 206c and mixer circuitry 206a. RF circuitry 206 may also include synthesizer circuitry 206d for synthesizing a frequency for use by the mixer circuitry 206a of the receive signal path and the transmit signal path. In some embodiments, the mixer circuitry 206a of the receive signal path may be configured to down-convert RF signals received from the FEM circuitry 208 based on the synthesized frequency provided by synthesizer circuitry 206d. The amplifier circuitry 206b may be configured to amplify the down-converted signals and the filter circuitry 206c may be a low-pass filter (LPF) or band-pass filter (BPF) configured to remove unwanted signals from the down-converted signals to generate output baseband signals. Output baseband signals may be provided to the baseband circuitry 204 for further processing. In some embodiments, the output baseband signals may be zero-frequency baseband signals, although this is not a requirement. In some embodiments, mixer circuitry 206a of the receive signal path may comprise passive mixers, although the scope of the embodiments is not limited in this respect.

In some embodiments, the mixer circuitry 206a of the transmit signal path may be configured to up-convert input baseband signals based on the synthesized frequency provided by the synthesizer circuitry 206d to generate RF output signals for the FEM circuitry 208. The baseband signals may be provided by the baseband circuitry 204 and may be filtered by filter circuitry 206c. The filter circuitry 206c may include a low-pass filter (LPF), although the scope of the embodiments is not limited in this respect.

In some embodiments, the mixer circuitry 206a of the receive signal path and the mixer circuitry 206a of the transmit signal path may include two or more mixers and may be arranged for quadrature downconversion and/or upconversion respectively. In some embodiments, the mixer circuitry 206a of the receive signal path and the mixer circuitry 206a of the transmit signal path may include two or more mixers and may be arranged for image rejection (e.g., Hartley image rejection). In some embodiments, the mixer circuitry 206a of the receive signal path and the mixer circuitry 206a may be arranged for direct downconversion and/or direct upconversion, respectively. In some embodiments, the mixer circuitry 206a of the receive signal path and the mixer circuitry 206a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 206 may include analog-to-digital converter (ADC) and digital-to-analog converter (DAC) circuitry and the baseband circuitry 204 may include a digital baseband interface to communicate with the RF circuitry 206.

In some dual-mode embodiments, a separate radio IC circuitry may be provided for processing signals for each spectrum, although the scope of the embodiments is not limited in this respect.

In some embodiments, the synthesizer circuitry 206d may be a fractional-N synthesizer or a fractional N/N+1 synthesizer, although the scope of the embodiments is not limited in this respect as other types of frequency synthesizers may be suitable. For example, synthesizer circuitry 206d may be a delta-sigma synthesizer, a frequency multiplier, or a synthesizer comprising a phase-locked loop with a frequency divider.

The synthesizer circuitry 206d may be configured to synthesize an output frequency for use by the mixer circuitry 206a of the RF circuitry 206 based on a frequency input and a divider control input. In some embodiments, the synthesizer circuitry 206d may be a fractional N/N+1 synthesizer.

In some embodiments, frequency input may be provided by a voltage controlled oscillator (VCO), although that is not a requirement. Divider control input may be provided by either the baseband circuitry 204 or the applications processor 202 depending on the desired output frequency. In some embodiments, a divider control input (e.g., N) may be determined from a look-up table based on a channel indicated by the applications processor 202.

Synthesizer circuitry 206d of the RF circuitry 206 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 206d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency ($f_{LO}$). In some embodiments, the RF circuitry 206 may include an IQ/polar converter.

FEM circuitry 208 may include a receive signal path which may include circuitry configured to operate on RF signals received from one or more antennas 210, amplify the received signals and provide the amplified versions of the received signals to the RF circuitry 206 for further processing. FEM circuitry 208 may also include a transmit signal path which may include circuitry configured to amplify signals for transmission provided by the RF circuitry 206 for transmission by one or more of the one or more antennas 210.

In some embodiments, the FEM circuitry 208 may include a TX/RX switch to switch between transmit mode and receive mode operation. The FEM circuitry may include a receive signal path and a transmit signal path. The receive signal path of the FEM circuitry may include a low-noise amplifier (LNA) to amplify received RF signals and provide the amplified received RF signals as an output (e.g., to the RF circuitry 206). The transmit signal path of the FEM circuitry 208 may include a power amplifier (PA) to amplify input RF signals (e.g., provided by RF circuitry 206), and one or more filters to generate RF signals for subsequent transmission (e.g., by one or more of the one or more antennas 210.

In some embodiments, the communication device 200 may include additional elements such as, for example, memory/storage, display, camera, sensor, and/or input/output (I/O) interface as described in more detail below. In some embodiments, the communication device 200 described herein may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), or other device that may receive and/or transmit information wirelessly. In some embodiments, the UE 200 may include one or more user interfaces designed to enable user interaction with the system and/or peripheral component interfaces designed to enable peripheral component interaction with the system. For example, the UE 200 may include one or more of a keyboard, a keypad, a touchpad, a display, a sensor, a non-volatile memory port, a universal serial bus (USB) port, an audio jack, a power supply interface, one or more antennas, a graphics processor, an application processor, a speaker, a microphone, and other I/O components. The display may be an LCD or LED screen including a touch screen. The sensor may include a gyro sensor, an accelerometer, a proximity sensor, an ambient light sensor, and a positioning unit. The positioning unit may communicate with components of a positioning network, e.g., a global positioning system (GPS) satellite.

The antennas 210 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas 210 may be effectively separated to take advantage of spatial diversity and the different channel characteristics that may result.

Although the communication device 200 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

Figure 3:
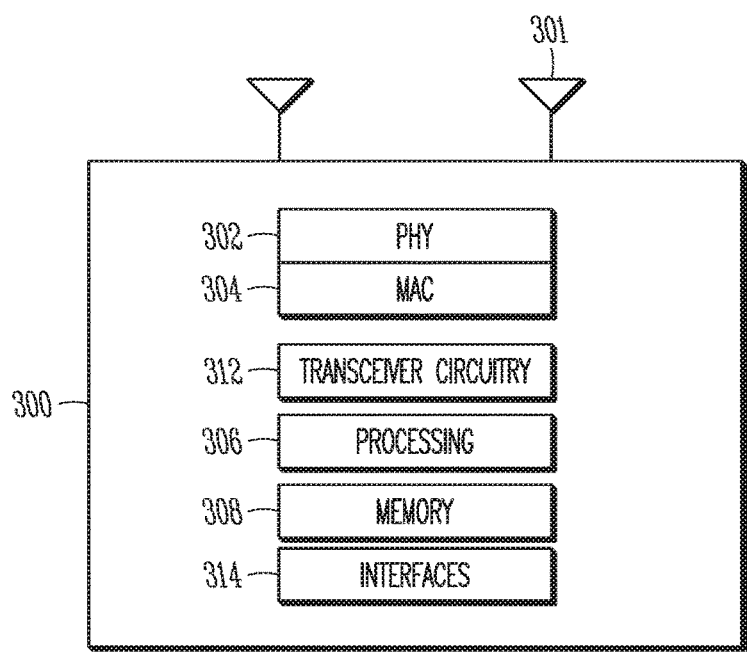
FIG. 3 illustrates a block diagram of a communication device in accordance with some embodiments.

FIG. 3 is a block diagram of a communication device in accordance with some embodiments. The communication device 300 may be a STA 103 or AP 102 shown in FIG. 1. In addition, the communication device 300 may also be suitable for use as an HE device 104 as shown in FIG. 1, such as an HE station. In some embodiments, the communication device 300 may be suitable for use as an EDMG device 105 as shown in FIG. 1, such as an EDMG station. Some of the components shown in FIG. 3 may not be present in all of the devices in FIG. 1.

The communication device 300 may include physical layer circuitry 302 for enabling transmission and reception of signals to and from the master station 102, HE devices 104. EDMG devices 105, other STAs 103, APs and/or other devices using one or more antennas 201. The physical layer circuitry 302 may perform various encoding and decoding functions that may include formation of baseband signals for transmission and decoding of received signals. The communication device 300 may also include medium access control layer (MAC) circuitry 304 for controlling access to the wireless medium. The communication device 300 may also include processing circuitry 306, such as one or more single-core or multi-core processors, and memory 308 arranged to perform the operations described herein. The physical layer circuitry 302, MAC circuitry 304 and processing circuitry 306 may handle various radio control functions that enable communication with one or more radio networks compatible with one or more radio technologies. The radio control functions may include signal modulation, encoding, decoding, radio frequency shifting, etc. For example, similar to the device shown in FIG. 2, in some embodiments, communication may be enabled with one or more of a WMAN, a WLAN, and a WPAN. In some embodiments, the communication device 300 can be configured to operate in accordance with 3GPP standards or other protocols or standards, including WiMax, WiFi, GSM, EDGE, GERAN, UMTS. UTRAN, or other 3G, 3G, 4G, 5G, etc. technologies either already developed or to be developed. The communication device 300 may include transceiver circuitry 312 to enable communication with other external devices wirelessly and interfaces 314 to enable wired communication with other external devices. As another example, the transceiver circuitry 312 may perform various transmission and reception functions such as conversion of signals between a baseband range and a Radio Frequency (RF) range.

The antennas 301 may comprise one or more directional or omnidirectional antennas, including, for example, dipole antennas, monopole antennas, patch antennas, loop antennas, microstrip antennas or other types of antennas suitable for transmission of RF signals. In some MIMO embodiments, the antennas 301 may be effectively separated to take advantage of spatial diversity and the different channel characteristics that may result.

Although the communication device 300 is illustrated as having several separate functional elements, one or more of the functional elements may be combined and may be implemented by combinations of software-configured elements, such as processing elements including DSPs, and/or other hardware elements. For example, some elements may comprise one or more microprocessors, DSPs, FPGAs, ASICs. RFICs and combinations of various hardware and logic circuitry for performing at least the functions described herein. In some embodiments, the functional elements may refer to one or more processes operating on one or more processing elements. Embodiments may be implemented in one or a combination of hardware, firmware and software. Embodiments may also be implemented as instructions stored on a computer-readable storage device, which may be read and executed by at least one processor to perform the operations described herein.

In some embodiments, the communication device 300 may be configured as an HE device 104 (FIG. 1) and/or an EDMG device 105 (FIG. 1), and may communicate using OFDM communication signals over a multicarrier communication channel. Accordingly, in some cases the communication device 300 may be configured to receive signals in accordance with specific communication standards, such as the Institute of Electrical and Electronics Engineers (IEEE) standards including IEEE 802.11-2012, 802.11n-2009 and/or 802.11ac-2013 standards and/or proposed specifications for WLANs including proposed HE standards and/or proposed EDMG standards, although the scope of the application is not limited in this respect as they may also be suitable to transmit and/or receive communications in accordance with other techniques and standards. In some other embodiments, the communication device 300 configured as an HE device 104 may be configured to receive signals that were transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In accordance with embodiments, the STA 103 may transmit a grant frame to indicate a transmission of a data payload by the STA 103 during a grant period. The grant frame may indicate whether the data payload is to be transmitted on primary channel resources or on secondary channel resources. The STA 103 may transmit the data payload to a destination STA 103 on the secondary channel resources when the grant frame indicates that the data payload is to be transmitted on the secondary channel resources. The grant frame may be transmitted on the primary channel resources and on the secondary channel resources when the grant frame indicates that the data payload is to be transmitted on the secondary channel resources. When the grant frame indicates that the data payload is to be transmitted on the primary channel resources, the grant frame may be transmitted on the primary channel resources and the STA 103 may refrain from transmission of the grant frame on the secondary channel resources. These embodiments will be described in more detail below.

In some embodiments, the channel resources may be used for downlink transmission by the AP 102 and for uplink transmissions by the STAs 103. That is, a time-division duplex (TDD) format may be used. In some embodiments, the channel resources may be used for direct communication between one or more STAs 103. For instance, the STAs 103 may be configured to communicate in a peer-to-peer (P2P) mode. As another example, the STAs 103 may be configured to communicate in a non Port Control Protocol/AP (non-PCP/AP) mode.

In some cases, the channel resources may include multiple channels, such as the 20 MHz channels or 2.16 GHz channels previously described. The channels may include multiple sub-channels or may be divided into multiple sub-channels for the uplink transmissions to accommodate multiple access for multiple STAs 103. The downlink transmissions and/or the direct transmissions between STAs 103 may or may not utilize the same format.

In some embodiments, the sub-channels may comprise a predetermined bandwidth. As a non-limiting example, the sub-channels may each span 2.03125 MHz, the channel may span 20 MHz, and the channel may include eight or nine sub-channels. Although reference may be made to a sub-channel of 2.03125 MHz for illustrative purposes, embodiments are not limited to this example value, and any suitable frequency span for the sub-channels may be used. In some embodiments, the frequency span for the sub-channel may be based on a value included in an 802.11 standard (such as 802.11ax and/or 802.11ay), a 3GPP standard or other standard.

In some embodiments, the sub-channels may comprise multiple sub-carriers. Although not limited as such, the sub-carriers may be used for transmission and/or reception of OFDM or OFDMA signals. As an example, each sub-channel may include a group of contiguous sub-carriers spaced apart by a pre-determined sub-carrier spacing. As another example, each sub-channel may include a group of non-contiguous sub-carriers. That is, the channel may be divided into a set of contiguous sub-carriers spaced apart by the pre-determined sub-carrier spacing, and each sub-channel may include a distributed or interleaved subset of those sub-carriers. The sub-carrier spacing may take a value such as 78.125 kHz, 312.5 kHz or 15 kHz, although these example values are not limiting. Other suitable values that may or may not be part of an 802.11 or 3GPP standard or other standard may also be used in some cases. As an example, for a 78.125 kHz sub-carrier spacing, a sub-channel may comprise 26 contiguous sub-carriers or a bandwidth of 2.03125 MHz.

Figure 4:
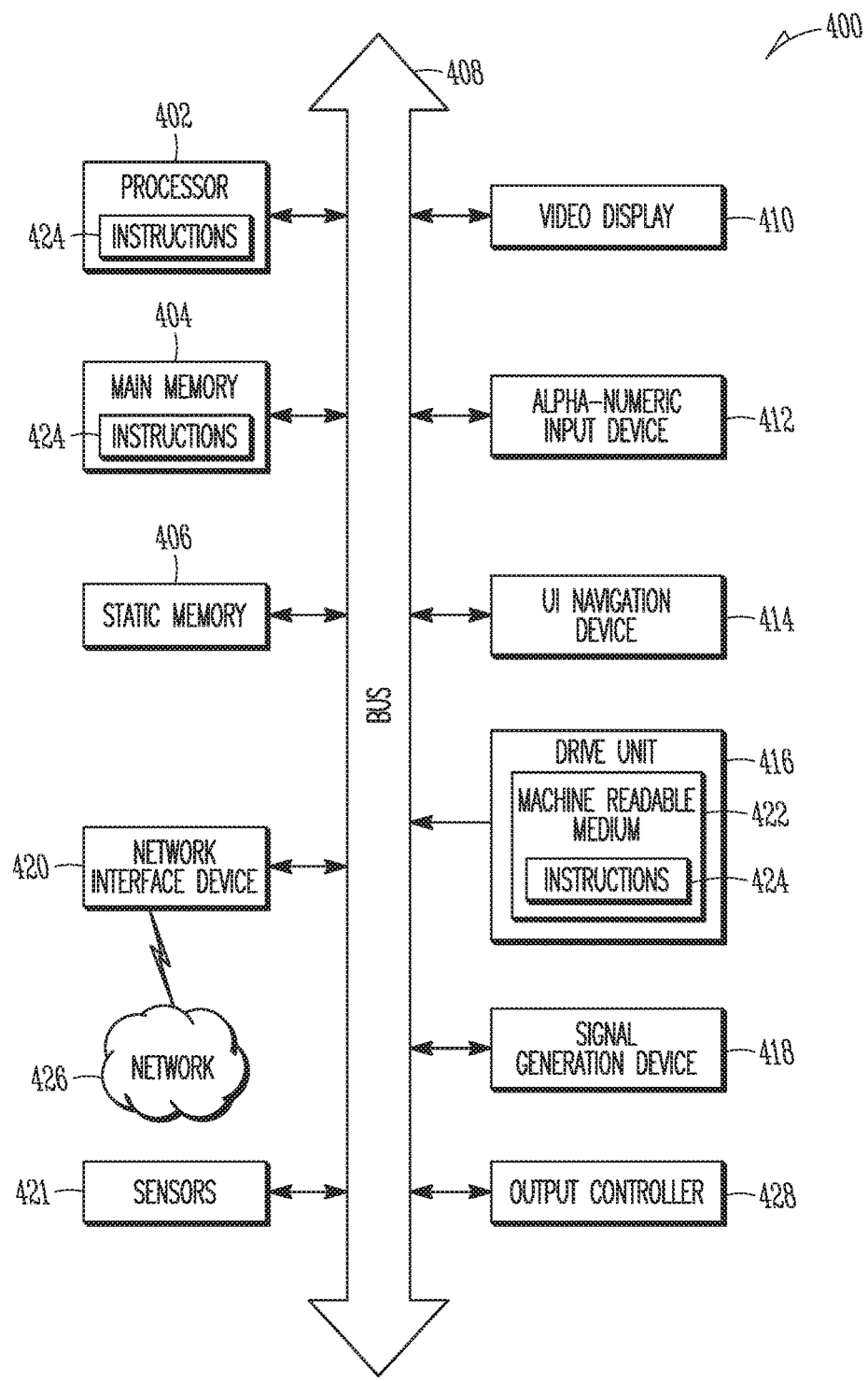
FIG. 4 illustrates another block diagram of a communication device in accordance with some embodiments.

FIG. 4 illustrates another block diagram of a communication device in accordance with some embodiments. In alternative embodiments, the communication device 400 may operate as a standalone device or may be connected (e.g., networked) to other communication devices. In a networked deployment, the communication device 400 may operate in the capacity of a server communication device, a client communication device, or both in server-client network environments. In an example, the communication device 400 may act as a peer communication device in peer-to-peer (P2P) (or other distributed) network environment. The communication device 400 may be a UE, eNB, AP, STA, PC, a tablet PC, a STB, a PDA, a mobile telephone, a smart phone, a web appliance, a network router, switch or bridge, or any communication device capable of executing instructions (sequential or otherwise) that specify actions to be taken by that communication device. Further, while only a single communication device is illustrated, the term "communication device" shall also be taken to include any collection of communication devices that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a communication device readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Communication device (e.g., computer system) 400 may include a hardware processor 402 (e.g., a central processing unit (CPU), a graphics processing unit (GPU), a hardware processor core, or any combination thereof), a main memory 404 and a static memory 406, some or all of which may communicate with each other via an interlink (e.g., bus) 408. The communication device 400 may further include a display unit 410, an alphanumeric input device 412 (e.g., a keyboard), and a user interface (UI) navigation device 414 (e.g., a mouse). In an example, the display unit 410, input device 412 and UI navigation device 414 may be a touch screen display. The communication device 400 may additionally include a storage device (e.g., drive unit) 416, a signal generation device 418 (e.g., a speaker), a network interface device 420, and one or more sensors 421, such as a global positioning system (GPS) sensor, compass, accelerometer, or other sensor. The communication device 400 may include an output controller 428, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 416 may include a communication device readable medium 422 on which is stored one or more sets of data structures or instructions 424 (e.g., software) embodying or utilized by any one or more of the techniques or functions described herein. The instructions 424 may also reside, completely or at least partially, within the main memory 404, within static memory 406, or within the hardware processor 402 during execution thereof by the communication device 400. In an example, one or any combination of the hardware processor 402, the main memory 404, the static memory 406, or the storage device 416 may constitute communication device readable media.

While the communication device readable medium 422 is illustrated as a single medium, the term "communication device readable medium" may include a single medium or multiple media (e.g., a centralized or distributed database, and/or associated caches and servers) configured to store the one or more instructions 424.

The term "communication device readable medium" may include any medium that is capable of storing, encoding, or carrying instructions for execution by the communication device 400 and that cause the communication device 400 to perform any one or more of the techniques of the present disclosure, or that is capable of storing, encoding or carrying data structures used by or associated with such instructions. Non-limiting communication device readable medium examples may include solid-state memories, and optical and magnetic media. Specific examples of communication device readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); and CD-ROM and DVD-ROM disks. In some examples, communication device readable media may include non-transitory communication device readable media. In some examples, communication device readable media may include communication device readable media that is not a transitory propagating signal.

The instructions 424 may further be transmitted or received over a communications network 426 using a transmission medium via the network interface device 420 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., IEEE 802.11 family of standards, IEEE 802.16 family of standards), IEEE 802.15.4 family of standards, a LTE family of standards, a Universal Mobile Telecommunications System (UMTS) family of standards, peer-to-peer (P2P) networks, among others. In an example, the network interface device 420 may include one or more physical jacks (e.g., Ethernet, coaxial, or phone jacks) or one or more antennas to connect to the communications network 426. In an example, the network interface device 420 may include a plurality of antennas to wirelessly communicate using at least one of single-input multiple-output (SIMO), MIMO, or multiple-input single-output (MISO) techniques. In some examples, the network interface device 420 may wirelessly communicate using Multiple User MIMO techniques. The term "transmission medium" shall be taken to include any intangible medium that is capable of storing, encoding or carrying instructions for execution by the communication device 400, and includes digital or analog communications signals or other intangible medium to facilitate communication of such software.

As above, there are a number of positioning techniques in IEEE 802.11 that may be used to determine the location of a STA. These techniques include Angle of Arrival (AoA) and Angle of Departure (AoD), in which downlink transmissions from the AP may be measured at an antenna array of the STA or uplink transmissions of the STA may be measured at an antenna array of the AP. The AoD/AoA is the angle between the transmission/reception direction of a reference signal from a linear antenna array and the normal axis of the array. In some cases, the Time Difference of Arrival (TDOA) may be measured at individual elements of the array. The received AP signal between successive antenna elements may be phase-shifted, and the degree of phase shift may depend on the AoD/AoA, the antenna element spacing, and the carrier frequency. By measuring the phase shift and using known AP characteristics, the AoD/AoA can be determined.

One issue with using AoA is that for user STAs, such as cell phones, the AoA may change dependent on the orientation of the STA, which may constantly move. Thus, AoD may be a more useful overall technique to use for all types of STAs. Focusing in particular on AoD techniques, to improve scalability for position determination, an AoD technique may be used in which the AP is the only device transmitting at a particular point in time, with the STAs only being listeners. This may remove the dependency of the number of location transmissions on the number of STAs. Typically when using the AoD technique, the AP may transmit preambles from an antenna array while switching antennas to transmit different packets. The receiving STA, e.g., a mobile device, may decode these preambles and use the decoded information to estimate the AoD. The STA may thus perform a major part of the positioning calculation. Moreover, to perform the calculations, the STA may have previously obtained calibration data of the antennas from the AP and to store this information in a memory of the STA. The calibration data may include the relationship between the angle and phase of every antenna elements in the antenna array for each angle. This methodology may thus trade a reduction in the amount of network traffic to perform the STA positioning with an increase of work being performed by the STA, as well as an increased memory load with increasing numbers of antennas in the antenna array or increasing numbers of antenna arrays are used.

To reduce the calculation burden on the STA when using an AoD technique to determine the STA location, in some embodiments AoD estimation method may be used in which one or more APs may be configured to transmit signals to one or more STAs in a plurality of discrete directions and having a predefined order. The AoD estimation method may be single sided, that is the AP(s) is the only transmitter and the STA acting only as a receiver (no transmissions). Thus, there may be a defined relationship between the direction and timing of the transmissions, and in some circumstances, the signal characteristics. The AoD technique may use preambles to transmit one or more symbols on different tones or may use data frames to transmit the symbols on the different tones, and the different tones and/or symbols transmitted on different angles.

The STA may be configured to detect one or more of the tones that have a particular characteristic or combination of characteristics. For example, the STA may detect the strongest tone and/or a predetermined timing, such as the earliest tone. The latter may be useful when a large number of clusters or other scatterers are present, perhaps causing the strongest tone to shift while the earliest arriving tone remains the tone being received via the most direct route (line of sight). The earliest tone may be used in some embodiments to discriminate between multiple tones when the tones have a signal strength within a predetermined range of each other and/or when a large number of scatterers are present. In one embodiment, the AP may use, in total, 117 tones having a bandwidth of 40 MHz and a length of 4 ms. In other embodiments, for WiFi the number of tones may be variable with the bandwidth. For 40 MHz, for example, there may be only 108 available subcarriers in the data symbols. Several tones (as predefined by the standard as pilot tones) can still be used for phase and amplitude tracking. This may be done for each data symbol to help against certain impairments of the STAs; such pilots can thus be expected to still be used in the AoD symbols. Moreover, the length of the symbol may be variable—in 802.11a-b/g/n/ac it can be 3.6 µs to 4 µs. For 802.11ax (which is currently being developed), the symbol duration can range from 3.2 µs to 16 µs.

In some embodiments, the AP may transmit OFDM symbols in the plurality of directions. In particular, the AP may be configured to transmit each OFDM symbol (or set of OFDM symbols) using a different tone, or more than one OFDM symbol or tone, in a different direction according to a pattern known to the STA. Each tone transmitted in a particular direction may be unique, that is, different from each other tone transmitted in each other direction. This may permit the AoD estimation mechanism described herein to be performed without the AP transmitting the above mentioned calibration data to the STA or the STA receiving or storing the calibration data from the AP. This may also allow the calculation complexity at the STA to be reduced and the majority of the burden to be on the AP.

Figure 5:
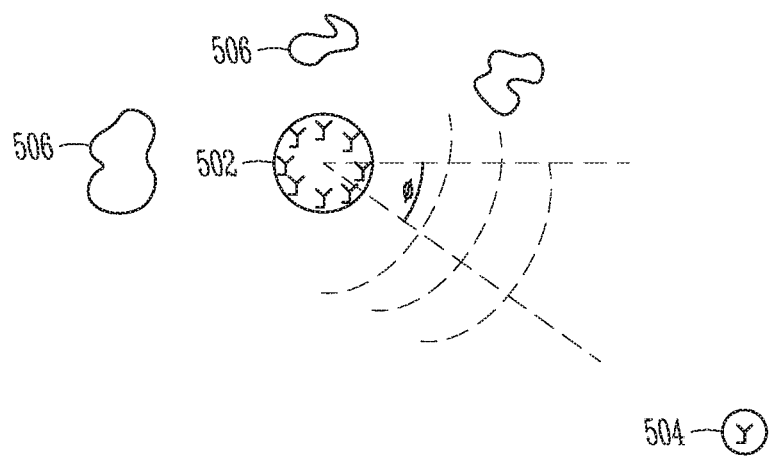
FIG. 5 illustrates a transmission from an access point (AP) at an Angle of Departure (AoD) in accordance with some embodiments.

FIG. 5 illustrates a transmission from an AP at an AoD in accordance with some embodiments. The AP 502 and STA 504 may be any of the devices shown in FIGS. 1-4. The AP 502 may have multiple antenna elements, for example, arranged in an antenna array. The AP 502 may transmit at an AoD of θ to the STA 504. The AoD may depend on the number of transmissions by the AP 502, with the AoD decreasing with increasing number. The STA 504 may be a single antenna STA or may have multiple antenna elements. In addition, one or more clusters 506 may be present at various points around the AP 502. Each cluster 506 may scatter the signal transmitted by the AP 502, leading to multipath interference and potentially shifting the maximum received tone, as above. The STA 504 may thus receive the OFDM symbols directly from the AP 502 or indirectly via scattering by the clusters 506.

Once the OFDM symbols are detected, the STA 504 may subsequently estimate the AoD of the direct (line-of-sight) signal. Once the AoD is estimated by the STA 504, a positioning solution can be achieved for the STA 504. The use of a single AP 502 whose location is known, for example, may serve to enable the STA 504 location to be determined in two dimensions, assuming the STA 504 height is known. Multiple APs may be used to determine the STA 504 position in three dimensions using triangulation.

In some embodiments, the AP 502 may transmit a single OFDM on a single tone in each direction. Thus, each direction may be associated with a different tone. In other embodiments, several different tones may be transmitted in a particular direction. In embodiments in which multiple tones are transmitted in each direction, the tones transmitted in different directions may be all different. In some embodiments, different numbers of tones may be transmitted in different angles. In some embodiments, the angles may be unequally spaced. For example, if a larger number of STAs are thought to be in a particular sector, the AP may decrease the angle in that sector. In some embodiments, multiple OFDM symbols may be transmitted on the same tone. In some embodiments, different numbers of OFDM symbols may be transmitted on different tones such that the number of OFDM symbols may be distributed unevenly among the tones, with each tone being associated with one or more OFDM symbols. To adjust the directionality of the transmission, the AP 502 may apply different phases to the antenna elements during a particular transmission, with the phases differing from one transmission (set of OFDM symbols corresponding to a particular angle) to the next transmission. In some embodiments, the phases may be preemptively calculated for each tone from each transmit antenna through a calibration process when the antenna array is available in advance. The calibration may be transmitted to the STA 504 from the AP 502.

In some embodiments, the AP 502 may determine the method of selecting the phase of each antenna element of the antenna array for each tone. For example, the AP 502 may implement an adaptive beamforming scheme, such as using Capon beamforming and/or any other suitable method, to choose the phases during transmission to the STA 504. Adaptive beamforming may be used to increase the signal strength associated with a particular direction via an array steering vector to provide for directional sensitivity without physically moving the antenna array. A Capon beamformer, for example, may adaptively select a weight vector of the array steering vector to minimize the array output power while retaining sufficient power to limit distortion of the signal. The Capon beamformer thus may minimize the expected power in all angles while keeping a constant power at the desired angle.

The STA 504 may receive the AP transmissions, detecting the OFDM symbols and tones transmitted during the operational mode of the AP 502. Based on the selected tone, the STA 504 may estimate an AoD of the transmissions from the AP 502. Note that although only one STA is shown, multiple STAs may receive the AP transmissions. At each STA, different propagation delays between the AP antennas of the antenna array and the STA may cause different tones to be received with different amplitudes and/or phases. Each STA may process all received tones and estimate the AoD.

In particular, the STA 504 may retain association information relating each tone to a specific transmit angle at one or more times. In some embodiments, the association may be predetermined, as per the IEEE 802.11 (or other protocol) standard. In some embodiments, the STA 504 may be provided the association in a beacon frame transmitted by the AP 502. In addition or instead of being provided the association in the beacon frame, the STA 504 may be provided the association dynamically by the AP 502, e.g., immediately or soon before transmission of the tones. In either case, the STA 504 may be aware of the relationship between tone and angle, i.e., which angle was chosen for each tone.

The STA 504, as above, may determine which of one or more of the tones has or meets a predetermined characteristic or characteristics, such as the highest power and/or earliest. For example, tones transmitted at the angle of the line-of-sight (LOS) may be expected to be of higher power than tones transmitted at other angles, although the presence of a large number of clusters (interferers) may change this.

The characteristics used to select the tone(s) may be provided to the STA 504 from the AP 502 in the beacon frame or dynamically. In some embodiments, once the tone has been determined by the STA 504, the STA 504 may use the association information stored in memory or signaled by the AP to determine the estimate the AoD of the signal and the STA position. This permits the STA 504 to minimize calculations to determine the AoD and STA position, avoiding a majority of the calculations, as well as minimizing the memory used to store the association rather than phases of all elements in the array. The STA 504 may subsequently provide the AoD and/or position information to the AP 502 if desired or the information may be passed to and used by the application plane of the STA.

Figure 6:
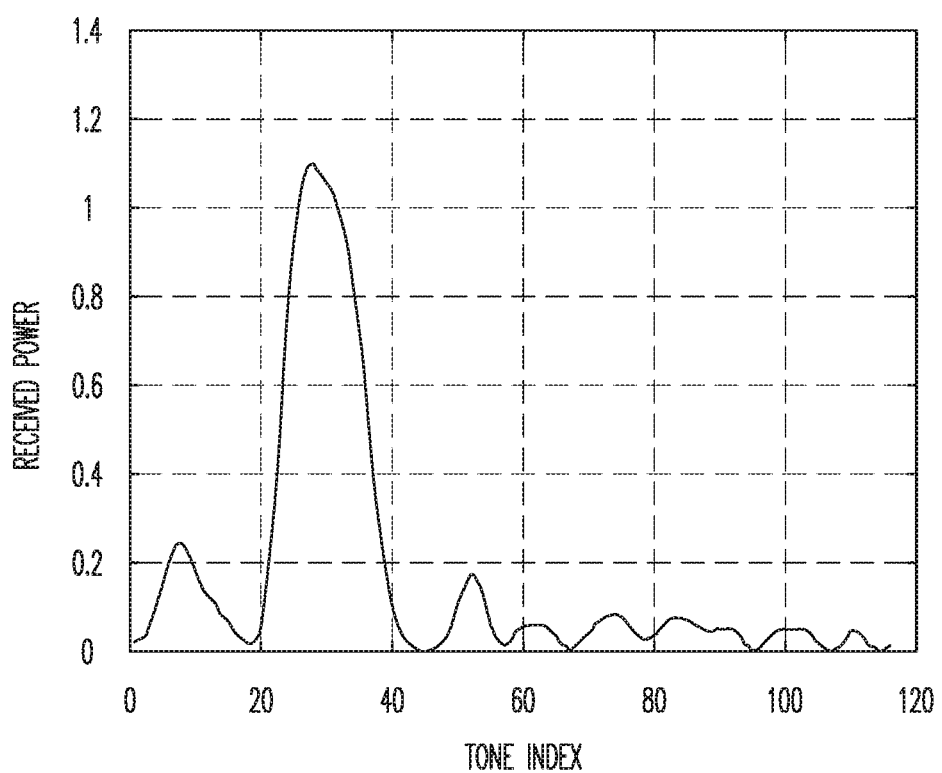
FIG. 6 is a graph depicting received power versus tone index in accordance with some embodiments.

FIG. 6 is a graph depicting received power versus tone index, in accordance with some embodiments. The graph may simulate a single instance of a B3 Hotspot WinnerII model AP, which has 8 antennas in a circular uniform array, and a STA with a single antenna located at 90 degrees in relation to the AP. The transmission from the AP may include, for example, 116 tones with 312.5 KHz subcarrier spacing. Each tone may be transmitted, for example, at a different angle along a 360° circle. In some embodiments, nearby tones may be used for nearby angles.

In some embodiments, the transmitter of the AP may implement a Capon beamformer as follows:

$$\theta_k = \frac{2\pi}{116}(k-1) \quad (1)$$

$$X_k = \frac{R_k^{-1} a_k(\theta_k)}{a_k^H(\theta_k) R_k^{-1} a_k(\theta_k)} \quad (2)$$

where k denotes a tone index and $\theta_k$ denotes an angle in which the tone with the index k is transmitted. The vector $a_k(\theta_k) \in C^{8 \times 1}$ may include an expected steering vector from the eight AP antennas to the STA as follows:

$$a_k(\theta_k) = \exp\left(-\frac{2i\pi}{\lambda_k} r_{Tx}^T r_{\theta_k}\right) \quad (3)$$

where $\lambda_k$ denotes a subcarrier wavelength, $r_{Tx}$ denotes a vector pointing at the AP antennas, and $r_{\theta_k}$ denotes a unit vector at the angle $\theta_k$. $R_k$ denotes a matrix $R_k \in C^{8 \times 8}$ as follows:

$$R_k = \frac{1}{2\pi} \int a_k(\theta_k) a_k(\theta_k)^H d\theta_k \quad (4)$$

Figure 7:
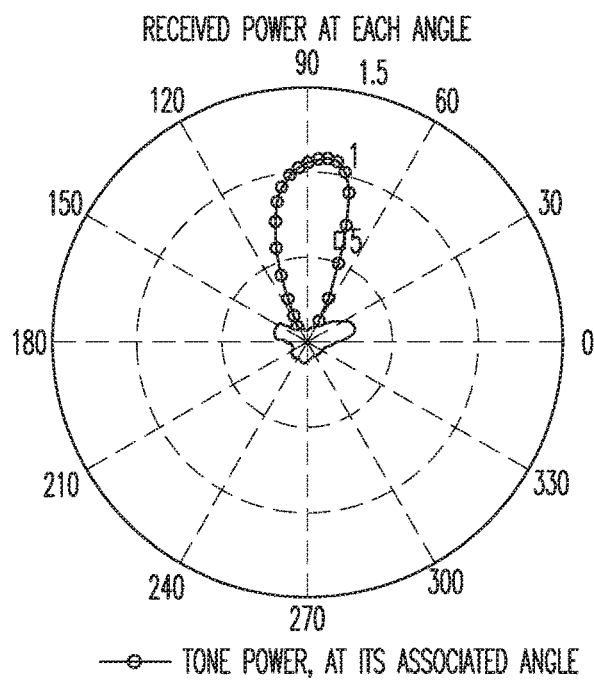
FIG. 7 is a graph depicting received power versus transmit angle in accordance with some embodiments.

A particular tone may correspond to a peak in the received power. As shown in FIG. 6, for example, the tone index corresponding to the peak received power is 34. FIG. 7 is a graph depicting received power versus transmit angle in accordance with some embodiments. The same specifics for the AP and STA used in FIG. 6 are assumed in the graph of FIG. 7. The association between received power and transmit angle shown in FIG. 7 may be determined at the STA after the receiver associates each tone to a respective predefined transmit angle.

In some embodiments, the AP may be configured to transmit several tones in the same angle. The transmission of multiple tones in the same angle may allow the STA, for example, to benefit from frequency diversity. Additionally or alternatively, the transmission of several tones per angle may allow the STA to employ, for example, a time-of-flight (ToF) estimation to select a LOS angle. As shown in FIG. 7, as the STA has a single antenna located at 90° in relation to the AP, the maximum received power of a particular tone is centered around 90°, with minor side lobes approximately 60° from the main lobe.

Figure 8:
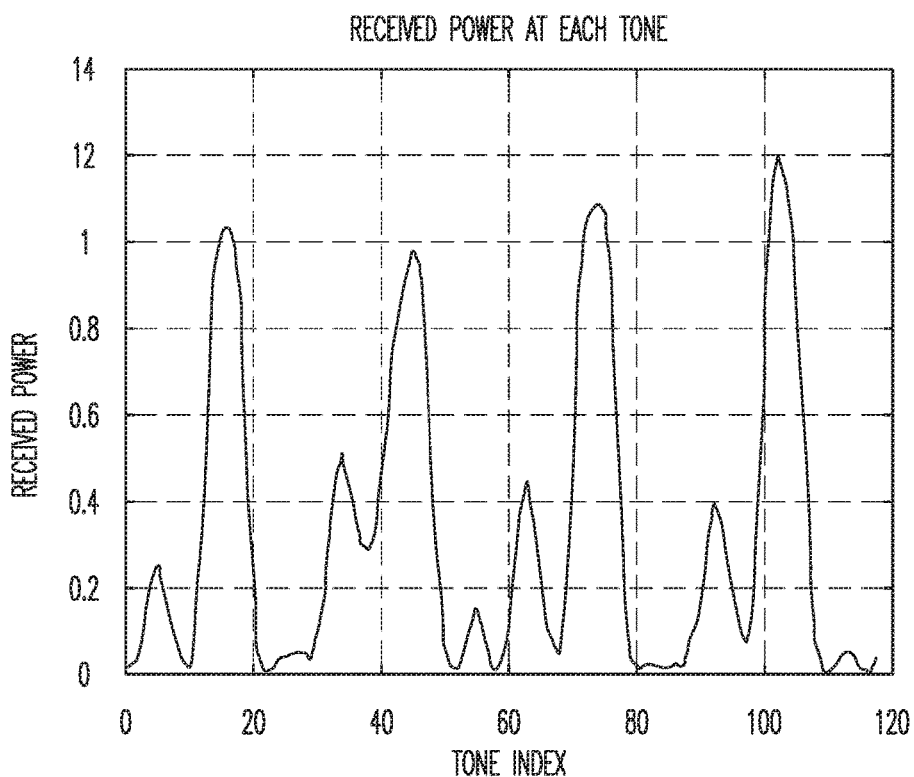
FIG. 8 is a graph depicting received power versus tone index in accordance with some embodiments.

FIG. 8 is a graph depicting received power versus tone index in accordance with some embodiments. The same specifics for the AP and STA used in FIGS. 6 and 7 are assumed in the graph of FIG. 8. For example, the peaks may occur when the AP sets the transmit angles as $$\theta_k = \frac{\pi}{116}(k-1) \bmod 29,$$

which as shown in FIG. 8 occurs when k=15, 44, 73 and 102. In this case, every angle may be transmitted four times and may use different subcarriers. In this example, a second OFDM symbol may be transmitted, for example, for angles between $\pi$ and $2\pi$.

Figure 9:
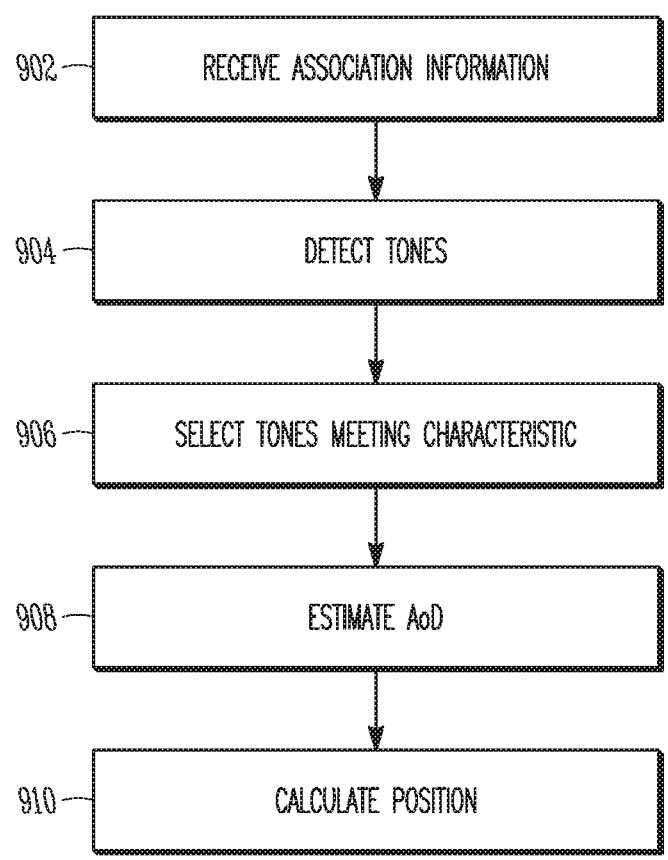
FIG. 9 illustrates a method of determining AoD and position in accordance with some embodiments.

FIG. 9 illustrates a method of determining Angle of Departure (AoD) and position in accordance with some embodiments. The method may be performed by any of the STAs shown and described in FIGS. 1-4. Embodiments of the method may thus include additional or fewer operations or processes in comparison to what is illustrated in FIG. 9. In addition, embodiments of the method are not necessarily limited to the chronological order that is shown in FIG. 9. The method may be practiced with suitable systems, interfaces and components. In addition, while the method and other methods described herein may refer to STAs operating in accordance with IEEE 802.11 or other standards, embodiments of those methods are not limited to just those STAs and may also be practiced by other mobile devices.

At operation 902, the STA may receive association information from the AP. The AP may initially set each antenna element to a particular phase to set a specific angle or angular range for transmission. The AP may then establish one or more tones for that transmission. The association information may include the relationship between the tones and angle and/or angle and timing. The association information may be sent from the AP and received by the STA. The tones may be, for example, OFDM tones. In some embodiments, the association may be received by the STA in a beacon frame or soon before or after the tones carrying the OFDM symbols are received. In some embodiments, operation 902 may be avoided altogether, the association information being set per a standard.

The STA may at operation 904 subsequently receive from the AP one or more OFDM symbols on each of the tones. The AP may implement an adaptive beamforming scheme to choose the antenna phases during transmission of the tones to the STA. The tones may be transmitted continuously over a predetermined time period (or number of 360° sweeps) or may be transmitted intermittently at different angles such that all of the angles (and tones) are transmitted over an extended time period. In some embodiments the tonal transmissions may cover a set of one or more angles, transmit data, and later the tonal transmissions may cover a different set of one or more angles. The AP may transmit, and the STA receive, a single tone at each angle or multiple tones at each angle. In either case, each tone transmitted at a particular angle may be unique from those of other angles. In some embodiments, one or more OFDM symbols may be transmitted on each tone, with the number of OFDM symbols carried by each tone and/or number of tones in each angle either being the same or different. In embodiments in which multiple tones are transmitted at a particular angle, the tones may be spread uniformly (or non-uniformly) across the spectrum. For example, if a number of scatterers are present, it may be desirable to transmit different tones at the same time (or within a short time), with the tones being widely separated to take advantage of the randomness and different scattering properties at different wavelengths. Alternatively, it may be desirable to transmit similar tones at different times, with at least some of the tones being clustered together (and perhaps others being widely separated) to take advantage of the relative movement of the scatterers.

After having received the tones, the STA may determine one or more characteristics of the tones. The STA may then, at operation 906, select one or more tones whose characteristic(s) meet a predetermined criteria. The criteria may be based on, for example, signal strength or timing. For example, the STA may pick the tone with the strongest signal (or signal-to-noise or signal-to-interference and noise) and/or the tone with the shortest delay (earliest tone). The criteria from the AP may be received at the STA along with the association information, the tones, or at any other time prior to the STA selecting the tones. The STA may wait until all of the tones are received prior to selecting the tone(s), may wait until a subset of tones are received, or may operate dynamically, assessing each tone as it is detected.

Once one or more of the tones are selected, the STA may estimate the AoD of each tone. The STA may determine, for example, the tone with the strongest or earliest signal is the direct signal. To estimate the AoD, the STA may compare the tone with the tonal information indicating the relationship between the tone and the angle. When multiple OFDM symbols are used for a tone and/or multiple tones are used for an angle, the results may be averaged in comparison with the results from other tones.

Once the AoD is estimated by the STA, the STA may calculate at operation 910 the STA position. The STA may use the tones from a single AP to determine the 2D position or may use the tones from multiple APs to determine the 3D position using triangulation. The tones used by different APs may be the same or different, with the STA discriminating the tones by an identity of a packet carrying the symbols over the tones. The STA may provide the AoD and/or STA position information to the AP or may simply itself use the STA positioning. When the tones from multiple APs are used, the tone criteria used for each AP (i.e., whether or not a particular tone has the desired characteristic) may be independent. For example, signal strength may be used for both APs, or signal strength may be used for one AP and timing may be used for the other AP.

Further Examples are provided below.

Example 1 is a wireless apparatus comprising: a memory; and processing circuitry arranged to: decode a symbol transmitted on each of a plurality of tones from an access point (AP) in a plurality of angles, wherein, for each angle of the plurality of angles, a tone transmitted in the angle is unique; determine that a particular tone meets a predetermined characteristic; and estimate an Angle of Departure (AoD) from the particular tone.

In Example 2, the subject matter of Example 1 optionally includes that the processing circuitry is further arranged to: estimate the AoD through use of an association, stored in the memory, between tone and transmission angle for each of the plurality of tones.

In Example 3, the subject matter of Example 2 optionally includes that the memory is further arranged to store the association and the association is: received from the AP one of in a beacon frame and dynamically prior to detection of the plurality of tones.

In Example 4, the subject matter of any one or more of Examples 1-3 optionally include that the processing circuitry is further arranged to: decode a plurality of symbols transmitted on each of the plurality of tones, and determine that the particular tone meets the predetermined characteristic based on averaging of characteristics of the symbols of the particular tone.

In Example 5, the subject matter of any one or more of Examples 1-4 optionally include that: the predetermined characteristic comprises at least one of signal strength and earliest tone, and the processor circuitry is to use the earliest tone to discriminate between multiple tones when at least one of the multiple tones have a signal strength within a predetermined range of each other.

In Example 6, the subject matter of any one or more of Examples 1-5 optionally include that the memory is arranged to: store the predetermined characteristic, the predetermined characteristic received from the AP one of in a beacon frame and dynamically prior to detection of the plurality of tones.

In Example 7, the subject matter of any one or more of Examples 1-6 optionally include that the processing circuitry is further arranged to: decode multiple tones for each angle, in which for each angle the multiple tones are unique, and average the multiple tones associated with an angle to determine that the particular tone associated with the angle meets the predetermined characteristic.

In Example 8, the subject matter of any one or more of Examples 1-7 optionally include that the processing circuitry is further arranged to: calculate a position of the apparatus using the AoD.

In Example 9, the subject matter of any one or more of Examples 1-8 optionally include that the processing circuitry is further arranged to: decode another plurality of tones transmitted from another AP in another plurality of angles, wherein, for each angle of the plurality of other angles, a tone of the other plurality of tones transmitted in the angle is different from another tone of the other plurality of tones transmitted from the other AP in another angle; determine that a particular tone of the other plurality of tones meets the predetermined characteristic; and estimate another AoD using information of the particular tone of the other plurality of tones; and calculate a three dimensional position of the apparatus using the estimated AoD and the estimated other AoD.

In Example 10, the subject matter of any one or more of Examples 1-9 optionally include, further comprising a radio coupled to the processing circuitry.

In Example 11, the subject matter of Example 10 optionally includes, further comprising: one or more antennas coupled to the radio and arranged to transmit and receive communications with the AP.

Example 12 is an apparatus of an access point (AP) comprising: a memory; and processing circuitry arranged to: associate each of a plurality of tones with an angle of transmission such that at least one tone is associated with each angle and each angle is free from a tone associated with another angle, and generate for transmission to a station (STA) a symbol for each of the plurality of tones to permit the STA to determine an Angle of Departure (AoD) based on the plurality of tones.

In Example 13, the subject matter of Example 12 optionally includes that the processing circuitry is further arranged to: implement an adaptive beamforming scheme during transmission of the plurality of tones.

In Example 14, the subject matter of any one or more of Examples 12-13 optionally include that: the memory and processing circuitry are further arranged to generate the association for transmission to the STA one of in a beacon frame and dynamically prior to transmission of the plurality of tones.

In Example 15, the subject matter of any one or more of Examples 12-14 optionally include that the processing circuitry is further arranged to: generate for transmission to the STA a plurality of symbols on each of the plurality of tones to permit the STA to determine the AoD based on an average of characteristics of the symbols of each of the plurality of tones.

In Example 16, the subject matter of any one or more of Examples 12-15 optionally include that the processing circuitry is further arranged to: generate, for transmission to the STA one of in a beacon frame and dynamically prior to transmission of the plurality of tones, a characteristic for the STA to use in determination of the AoD.

In Example 17, the subject matter of Example 16 optionally includes that: the predetermined characteristic comprises at least one of signal strength and earliest tone, and earliest tone is used to discriminate between multiple tones when at least one of the multiple tones have a signal strength within a predetermined range of each other.

In Example 18, the subject matter of any one or more of Examples 12-17 optionally include that the processing circuitry is further arranged to: generate for transmission to the STA multiple tones for each direction, in which for each angle the multiple tones are unique to permit the STA to determine the AoD based on an average of characteristics of the multiple tones.

Example 19 is a computer-readable storage medium that stores instructions for execution by one or more processors of a station (STA), the one or more processors to configure the STA to: store an association between tone and transmission angle for each of a plurality of tones transmitted by an access point (AP) in a plurality of angles, the association indicating that, for each angle, a tone transmitted in the angle is unique; decode a symbol transmitted on each of the plurality of tones; determine characteristics of the plurality of tones, including strength and timing; and estimate an Angle of Departure (AoD) based on the association and one or more of the characteristics of at least one of the tones.

In Example 20, the subject matter of Example 19 optionally includes that the one or more processors further configure the STA to store the association and one of: the association is dependent on an Institute of Electrical and Electronics Engineers (IEEE) standard, and the one or more processors further configure the STA to receive from the AP one of in a beacon frame and dynamically prior to detection of the plurality of tones.

In Example 21, the subject matter of any one or more of Examples 19-20 optionally include that the one or more processors further configure the STA to: decode a plurality of symbols transmitted on each of the plurality of tones, and average characteristics of the symbols of each of the plurality of tones to determine the characteristics of each of the plurality of tones.

In Example 22, the subject matter of any one or more of Examples 19-21 optionally include that the one or more processors further configure the STA to: decode multiple tones for each angle, in which for each angle the multiple tones are unique, and average characteristics of the multiple tones associated with each angle to determine the characteristics of each of the plurality of tones.

In Example 23, the subject matter of any one or more of Examples 19-22 optionally include that the one or more processors further configure the STA to: store another association between tone and transmission angle for each of a plurality of tones transmitted by another AP in a plurality of angles, the other association indicating that, for each angle, a tone transmitted by the other AP in the angle is unique; decode a symbol transmitted by the other AP on each of the plurality of tones; determine characteristics of the plurality of tones transmitted by the other AP, including strength and timing; estimate another AoD for the other AP based on the other association and one or more of the characteristics of at least one of the tones transmitted by the other AP; and calculate a three dimensional position of the STA using the estimated AoD and the estimated other AoD.

Example 24 is a method of estimating an Angle of Departure (AoD) for a station (STA), the method comprising: storing an association between tone and transmission angle for each of a plurality of tones transmitted by an access point (AP) in a plurality of angles, the association indicating that, for each angle, a tone transmitted in the angle is unique, the association received from the AP in one of a beacon frame and dynamically prior to detection of the plurality of tones; decoding a symbol transmitted on each of the plurality of tones; determining strength of the plurality of tones; and estimating the AoD based on the association and the strength of at least one of the tones.

In Example 25, the subject matter of Example 24 optionally includes, further comprising: decoding a plurality of symbols transmitted on each of the plurality of tones, and averaging the strength of the symbols of each of the plurality of tones to determine the strength of each of the plurality of tones.

In Example 26, the subject matter of any one or more of Examples 24-25 optionally include 5, further comprising: decoding multiple tones for each angle, in which for each angle the multiple tones are unique, and averaging the strength of the multiple tones associated with each angle to determine the strength of each of the plurality of tones.

Example 27 is a station (STA) comprising: means for storing an association between tone and transmission angle for each of a plurality of tones transmitted by an access point (AP) in a plurality of angles, the association indicating that, for each angle, a tone transmitted in the angle is unique, the association received from the AP in one of a beacon frame and dynamically prior to detection of the plurality of tones; means for decoding a symbol transmitted on each of the plurality of tones; means for determining strength of the plurality of tones; and means for estimating the AoD based on the association and the strength of at least one of the tones.

In Example 28, the subject matter of Example 27 optionally includes means for decoding a plurality of symbols transmitted on each of the plurality of tones, and means for averaging the strength of the symbols of each of the plurality of tones to determine the strength of each of the plurality of tones.

In Example 29, the subject matter of any one or more of Examples 27-28 optionally include: means for decoding multiple tones for each angle, in which for each angle the multiple tones are unique, and means for averaging the strength of the multiple tones associated with each angle to determine the strength of each of the plurality of tones.

Although an embodiment has been described with reference to specific example embodiments, it will be evident that various modifications and changes may be made to these embodiments without departing from the broader scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the subject matter may be referred to herein, individually and/or collectively, by the term "embodiment" merely for convenience and without intending to voluntarily limit the scope of this application to any single inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, UE, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. A wireless apparatus comprising:
processing circuitry arranged to:
decode association information from an access point (AP), the association information comprising an association between an angle and at least one of a tone or timing for each of a plurality of tones, each angle associated with a unique tone or set of tones;
decode a symbol transmitted on each of the plurality of tones from the AP;
determine that a particular tone at least one of is a strongest or an earliest of the plurality of tones;
estimate an Angle of Departure (AoD) from the particular tone and from the association; and
determine a position of the wireless apparatus based on the AoD for a set of the plurality of tones; and
a memory configured to store the association.

2. The apparatus of claim 1, wherein:
the association is received from the AP one of in a beacon frame and dynamically prior to detection of the plurality of tones.

3. The apparatus of claim 1, wherein the processing circuitry is further arranged to:
decode a plurality of symbols transmitted on each of the plurality of tones, and
determine that the particular tone is at least one of the strongest or earliest of the plurality of tones based on averaging of characteristics of the symbols of the particular tone.

4. The apparatus of claim 1, wherein:
the processor circuitry is further configured to use the earliest tone to discriminate between multiple tones when at least the multiple tones have a signal strength within a predetermined range of each other.

5. The apparatus of claim 1, wherein the processor circuitry is further arranged to:
decode multiple tones in each angle, the tones spread uniformly across a spectrum comprising the plurality of tones.

6. The apparatus of claim 5, wherein the processing circuitry is further arranged to:
average the multiple tones associated with each angle to determine at least one of strength or timing for the angle.

7. The apparatus of claim 1, wherein the processing circuitry is further arranged to:
decode multiple tones in each angle, the tones transmitted at different times and at least some of the multiple tones being clustered together within a spectrum comprising the plurality of tones.

8. The apparatus of claim 1, wherein the processing circuitry is further arranged to:
decode another plurality of tones transmitted from another AP in another plurality of angles, wherein, for each angle of the plurality of other angles, wherein a tone of the other plurality of tones transmitted in the angle is different from another tone of the other plurality of tones transmitted from the other AP in another angle;
determine that a particular tone of the other plurality of tones at least one of is a strongest or earliest of the other plurality of tones;
estimate another AoD using information of the particular tone of the other plurality of tones; and
calculate a three dimensional position of the apparatus using the estimated AoD and the estimated other AoD.

9. The apparatus of claim 8, wherein the processing circuitry is further arranged to:
use a different characteristic from each AP to determine the AoD such that the processing circuitry is arranged to determine that the particular tone of the plurality of tones is the strongest of the plurality of tones and that the particular tone of the other plurality of tones is the earliest of the other plurality of tones.

10. The apparatus of claim 1, further comprising a radio coupled to the processing circuitry.

11. The apparatus of claim 10, further comprising:
one or more antennas coupled to the radio and arranged to transmit and receive communications with the AP.

12. An apparatus of an access point (AP) comprising:
processing circuitry arranged to:
encode, for transmission to a station (STA), association information comprising an association between an angle and at least one of a tone or timing for each of a plurality of tones, each angle associated with a unique tone or set of tones;
generate, for transmission to the STA, a symbol for each of the plurality of tones to permit the STA to determine an Angle of Departure (AoD) based on which of the tones is at least one of a strongest or an earliest of the plurality of tones as well as the association;
decode the AoD from the STA; and
determine a position of the wireless apparatus based on the AoD; and
a memory configured to store the association.

13. The apparatus of claim 12, wherein the processing circuitry is further arranged to:
implement an adaptive beamforming scheme during transmission of the plurality of tones.

14. The apparatus of claim 12, wherein:
the association is transmitted to the STA one of in a beacon frame and dynamically prior to transmission of the plurality of tones.

15. The apparatus of claim 12, wherein the processing circuitry is further arranged to:
generate for transmission to the STA a plurality of symbols on each of the plurality of tones to permit the STA to determine the AoD based on an average of characteristics of the symbols of each of the plurality of tones.

16. The apparatus of claim 12, wherein the processing circuitry is further arranged to:
encode, for transmission to the STA, multiple tones in each angle, the tones spread uniformly across a spectrum comprising the plurality of tones.

17. The apparatus of claim 12, wherein:
the earliest tone is used to discriminate between multiple tones when the multiple tones have a signal strength within a predetermined range of each other.

18. The apparatus of claim 12, wherein the processing circuitry is further arranged to:
generate for transmission to the STA multiple tones for each direction, in which for each angle the multiple tones are unique to permit the STA to determine the AoD based on an average of characteristics of the multiple tones.

19. A computer-readable storage medium that stores instructions for execution by one or more processors of a station (STA), the one or more processors to configure the STA to:
store an association between tone and transmission angle for each of a plurality of tones transmitted by an access point (AP) in a plurality of angles, the association indicating that, for each angle, a tone or set of tones transmitted in the angle is unique;

decode a symbol transmitted on each of the plurality of tones;

determine characteristics of the plurality of tones, including strength and timing;

estimate an Angle of Departure (AoD) based on the association and one or more of the characteristics of at least one of the tones; and determine a position based on the AoD for a set of the plurality of tones.

20. The medium of claim 19, wherein:

the association is received from the AP one of in a beacon frame and dynamically prior to detection of the plurality of tones.

21. The medium of claim 19, wherein the one or more processors further configure the STA to:

decode a plurality of symbols transmitted on each of the plurality of tones, and average characteristics of the symbols of each of the plurality of tones to determine the characteristics of each of the plurality of tones.

22. The medium of claim 19, wherein the one or more processors further configure the STA to:

decode multiple tones for each angle, in which for each angle the multiple tones are unique, and average characteristics of the multiple tones associated with each angle to determine the characteristics of each of the plurality of tones.

23. The medium of claim 19, wherein the one or more processors further configure the STA to:

store another association between tone and transmission angle for each of a plurality of tones transmitted by another AP in a plurality of angles, the other association indicating that, for each angle, a tone transmitted by the other AP in the angle is unique;

decode a symbol transmitted by the other AP on each of the plurality of tones;

determine characteristics of the plurality of tones transmitted by the other AP, including strength and timing;

estimate another AoD for the other AP based on the other association and one or more of the characteristics of at least one of the tones transmitted by the other AP; and calculate a three dimensional position of the STA using the estimated AoD and the estimated other AoD.

24. A method of determining a position for a station (STA), the method comprising:

storing in a memory an association between tone and transmission angle for each of a plurality of tones transmitted by an access point (AP) in a plurality of angles, the association indicating that, for each angle, a tone transmitted in the angle is unique, the association received from the AP in one of a beacon frame and dynamically prior to detection of the plurality of tones;

decoding, by processing circuitry, a symbol transmitted on each of the plurality of tones;

determining, by the processing circuitry, strength of the plurality of tones;

estimating, by the processing circuitry, an Angle of Departure (AoD) based on the association and the strength of at least one of the tones; and determining, by the processing circuitry, the position based on the AoD for a set of the plurality of tones.

25. The method of claim 24, further comprising:

decoding a plurality of symbols transmitted on each of the plurality of tones, and averaging the strength of the symbols of each of the plurality of tones to determine the strength of each of the plurality of tones.

26. The method of claim 24, further comprising:

decoding multiple tones for each angle, in which for each angle the multiple tones are unique, and averaging the strength of the multiple tones associated with each angle to determine the strength of each of the plurality of tones.

* * * * *